2,414,909

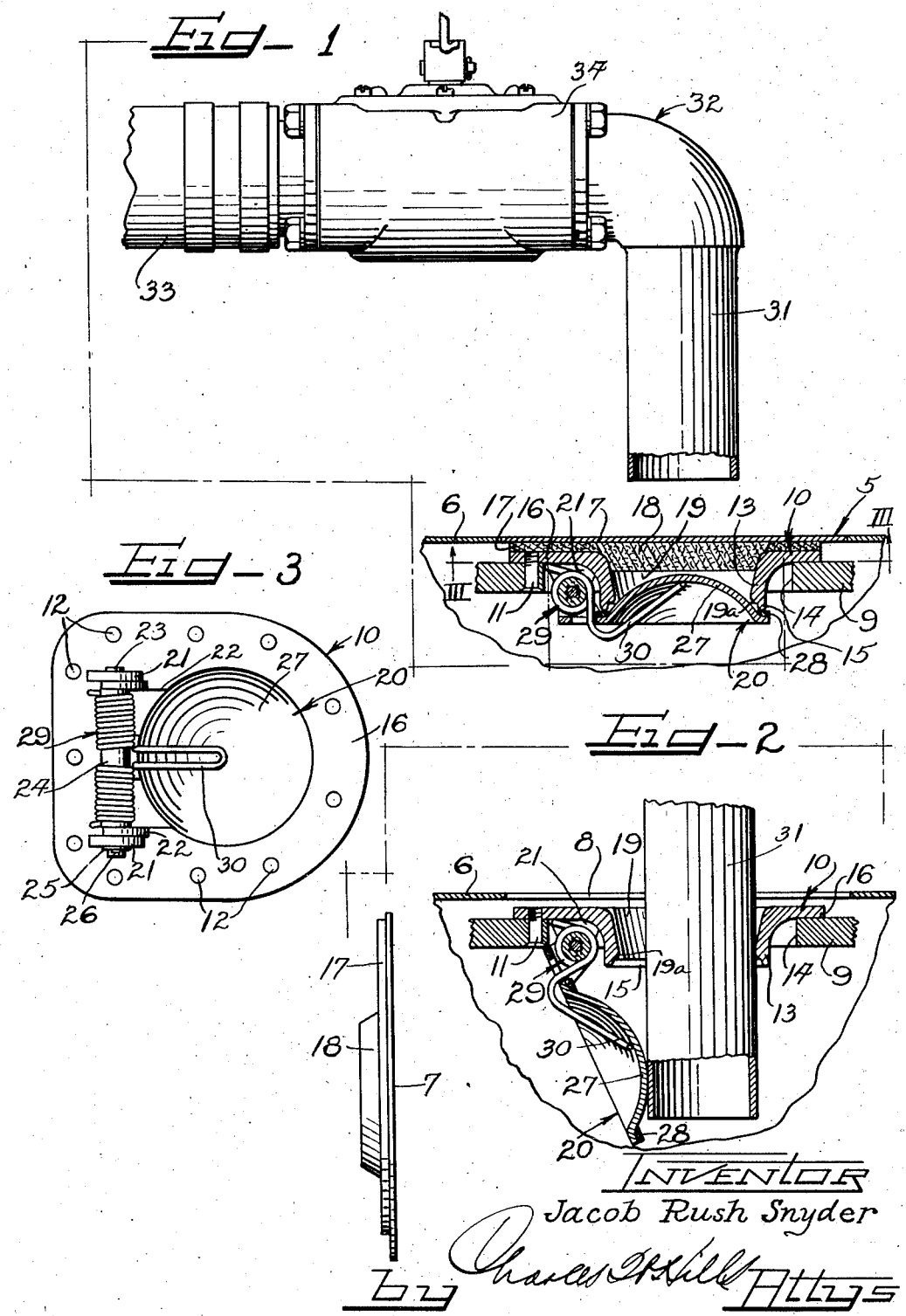
Jan. 28, 1947. J. R. SNYDER 2,414,909
SELF-CLOSING FILLER CAP ASSEMBLY
Filed May 10, 1944
INVENTOR
Jacob Rush Snyder Patented Jan. 28, 1947

UNITED STATES PATENT OFFICE 2,414,909

SELF-CLOSING FILLER CAP ASSEMBLY

Jacob Rush Snyder, Cleveland, Ohio, assignor to Thompson Products, Inc., Cleveland, Ohio, a corporation of Ohio Application May 10, 1944, Serial No. 534,895

2 Claims. (Cl. 244—135)

The present invention relates to vehicular fluid storage systems such, for example, as that employed for storing of fuel for use in an airplane or the like. More particularly, the invention is concerned with a self-closing filler cap assembly for vehicular fuel storage tanks and other similar installations.

In the filling of vehicular fuel tanks, particularly those associated with an airplane, it is the usual practice to employ a fill hose embodying a shut-off valve and a nozzle or nipple for dispensing the fuel from a suitable supply or storage means to said tanks. In an airplane it is usually necessary to remove an access panel or plate covering the fill opening of the tank and forming part of the airplane fuselage or wing structure in which the tanks are disposed. Such panels are employed in concealing and protecting the fill opening of the tank. Next the cap or closure means for the fill opening itself must be removed before the end of the fill pipe may be inserted.

After the tanks have been filled, the replacement of the cap for the fill opening is frequently overlooked. This omission not only permits the entrance of dust, dirt and other foreign matter into the fuel supply but also exposes the highly inflammable fuel to the possibility of ignition thereby creating a potentially dangerous situation.

The present invention contemplates the provision of means which not only facilitate the filling of the tank but which will also automatically close and hermetically seal the tank following the completion of the filling operation.

It is an object of the present invention to provide a self-closing filler cap structure which will be automatically opened by contact with the end of the fill pipe of the equipment supplying the fuel or other fluid to the storage tank.

It is also an object of the present invention to provide a self-closing filler cap structure which will automatically and hermetically seal the tank opening upon the removal of the fill pipe.

It is a further object of the present invention to provide a suitable filler cap assembly in which a valve member is so constructed that it presents a generally convex dome surface affording a substantial point contact for the end of the fill pipe so that the end will not jam during opening of the cap and will not damage the valve member or its seat.

Another and still further object of the present invention is to provide a filler cap assembly embodying a valve member which is hingedly mounted within the tank having an annular resilient seal on the seating portion thereof for sealing the fill opening in the tank and presenting a centrally disposed convex surface extending outwardly with respect to the tank opening so as to contact the end of the fill pipe and prevent it from scuffing or damaging the annular seal.

It is a still further object of the present invention to provide means facilitating the filling of a vehicular fuel tank embodying a self-closing cap and a cooperating removable panel in the vehicular body protecting but providing access to the fill opening of the tank, the panel being provided with a resilient cushion member to prevent sand, dust or other foreign material from accumulating in or around the fill opening of the tank.

Another object is to provide a cap and cap seat assembly for tanks and the like which has mating sealing surfaces so disposed that an inserted fill pipe cannot contact the surfaces.

Other and still further objects of the invention will be apparent to those skilled in the art from the following detailed description of the annexed sheet of drawings which, by way of preferred example only, illustrates one embodiment of the invention.

On the drawing:

Figure 1 is a sectional view of the filler cap assembly associated with a fill pipe having portions broken away and showing the filler cap assembly in closed position;

Figure 2 corresponds generally to Figure 1 but illustrates the filler cap assembly in open position with respect to the end of the fill pipe inserted therein; and Figure 3 is a bottom plan view along the line III—III of Figure 1.

As shown on the drawing:

The filler cap assembly designated generally by the reference character 5 in Figures 1 and 2 of the drawing is adapted to be employed in connection with any form of storage tank or the like in which a fill opening is provided for the introduction of fluid to the tank. The assembly 5 has been illustrated as being employed in a fuel tank for an airplane wherein such tanks are customarily disposed in the wings or fuselage of the plane. In the drawing, the airplane wing structure 6 is provided with a removable panel or access door 7 which fits into an aperture 8 formed in the top wing skin or top surface to protect and conceal the fill opening of the fuel tank 9.

A flanged member 10 is secured to the outer wall of the tank 9 adjacent the opening 8 in the wing 6 as by means of a plurality of machine screws 11 which may be threaded into openings 12 (see Figure 3) in said flanged member 10. A collar portion 13 on the flanged member 10 is adapted to project into the fill opening 14 provided in the tank 9. The collar portion 13 of the flanged member 10 is provided with an annular seat portion 15 at its extremity.

The access door 7, or panel as the case may be, is adapted to fit into the opening 8 in the wing 6 and is supported from the flanged portion 16 of the flanged member 10 as by means of a pad 17 of felt or other suitable resilient material to form a facing for the door and a seal for the filler cap assembly 5. The pad 17 may take any suitable form but preferably conforms generally in shape to that of the flanged portion 16 on the flanged member 10. A plug 18 of substantially tapered form is adapted to be disposed centrally of the pad 17 for registration with a port 19 defined by the tapered inner wall of the collar portion 13 of the flanged member 10. Both the pad 17 and the plug 18 may be affixed to the surface of the access door 7 by any suitable form of adhesive or other satisfactory bonding material.

The access door 7 when fitted into place tightly closes the space between the flanged member 10 and the under surface of the wing 6 thereby preventing dust, dirt and other foreign material from accumulating in or about the port 19 in the flanged member 10 of the filler cap assembly 5. The access door 7 may be secured in place in any suitable fashion such, for example, as by means of various forms of cowl fasteners such as are customarily employed in removably mounting such panels on airplanes and the like. The access door 7 when closed cooperates with the outer surface of the wing 6 to provide a practically smooth surface therewith.

A valve member 20 is hingedly mounted from the under side of the flanged member 10 for cooperation with the seat 15 formed on the collar portion 13 to close the port 19 except when it is desired to fill the tank 9 with fluid. A pair of lugs 21 are formed on the flanged member 10 and cooperate with the projections 22 formed on the valve member 20 to receive a headed pin 23 therethrough. A spacer sleeve 24 on the pin 23 is disposed between the projections 22. The pin and sleeve assembly is held in place by means of a washer 25 on the pin abutting a lug 21 and a cotter pin 26 is passed through the pin 23 to hold the washer. The apertures in the lugs 21 for receiving pin 23 are advantageously elongated as indicated in dotted lines in Figures 1 and 2 to compensate for minor manufacturing or operating irregularities in the interfitting relationship of the parts.

The valve member 20 is provided with a domed portion 27 which is convex in the direction of the axis of the port 19 in the collar portion 13 of the flanged member 10 and extending outwardly of the tank 9. An annular sealing ring 28 which is formed of resilient rubber-like material comprising any of several suitable synthetic plastics or similar compositions is bonded to the face of the valve member 20 and encircles the base of the domed portion 27. The annular seal 28 is so disposed on the valve member 20 that it is adapted to form a fluid tight seal with the seat 15 when the valve member 20 is held in place thereagainst. The seat 15 as shown in Figures 1 and 2 is radially outward from the port 19.

A spring 29, illustrated as being of the double torsion type fits around a spacer 24 and between the projecting portions 22. A looped portion 30 is formed intermediate the ends of the spring 29 and is adapted to bear against the under side of the domed portion 27 of the valve member 20. The free ends of the spring 29 contact the under surface of the flange 16 of the flanged member 10 and prevent the rotation of the spring element with respect to the spacer 24 whenever the valve member 20 is tilted about the pin 23 to open the port 19 against the looped portion 30 of said spring.

The spring 29 is inserted between the projections 22 in such fashion that it will retain the valve member 20 toward its closed position with respect to the seat 15 in the port 19. The spring 29, thus, insures the seating of the annular seal 28 on the valve member 20 with respect to the seat 15 of the collar portion 13.

From Figures 1 and 2, it will be understood that, when the end of the nipple 31 of the fill pipe 32 which embodies a flexible hose 33 coupled in any suitable fashion to one of the ports of a shut-off cock 34 is inserted in the port 19 in the collar portion 13 of the flanged member 10 forming part of the filler cap assembly 5, a substantial point contact of said nipple with the domed portion 27 of the valve member 20 is achieved. The contact of the nipple 31 with the domed portion 27 of the valve member 20 causes said valve member to pivot about its hinged mounting on the flanged member 10 against spring 29 so as to permit the end of the nipple to pass into the interior of the tank 9. After the tank has been filled to the proper or desired level with fluid, the nipple 31 is removed from the port 19 and the looped portion 30 of the spring 29 will immediately cause the valve member 20 to return to its closed position with respect to the seat 15 on collar portion 13 of the flanged member 10.

During the operation of filling the tank 9 with the fill pipe 32 the access door 7 is, of course, removed and placed temporarily to one side. It will be understood that the access door 7 may, if desired, be hingedly mounted with respect to the wing 6 in order that it may be readily replaced in the opening 8 when the fill pipe 32 is removed following the filling operation.

The domed portion 27 of the valve member 20 is, as previously indicated, advantageously of sufficiently arcuate form to provide substantial point contact with the end of the nipple 31 upon its insertion in the port 19. The arcuate form of the domed portion 27 also causes the valve member 20 to swing inwardly with respect to the wall of the tank 9 upon contact with the end of the nipple 31 in such a way as to prevent contact between the end of the nipple and the annular seal 28. The annular seal 28 as well as the domed portion 27 of the valve member 20 are, thus, protected against undue scuffing or damage resulting from contact with the end of the nipple 31 of the fill pipe 32.

In addition, a radially inwardly projecting protuberance 19a is formed on the wall of the port 19 adjacent the seat 15 and prevents the nipple 31 from ever having contact with the seat 15 as shown in Figure 2. This seat 15 is, therefore, also protected and the sealing surface of the assembly will not be damaged during filling operations even though such operations are performed by rough and careless operators. The protuberance 19a may take the form of an annular bead or a plurality of spaced inwardly projecting lugs.

It will be understood from Figures 1 and 2 that, as the fill pipe 32 is inserted in the port 19 and comes in contact with the domed portion 27 of the valve member 20, the nipple 31 will be caused to shift radially from the precise center of the arcuate surface to contact with the collar portion 13 as indicated in Figure 2. Thus, as the valve member 20 is swung open substantial point contact only with the nipple 31 will be established. The domed portion 27 operates to prevent contact of the end of the nipple 31 with the seal 28 due to its arcuate shape.

The principles of the present invention may be employed with equal facility to a filler pipe associated with a tank in a plane or other form of vehicle to facilitate the use of a fill pipe, hose, or nozzle arrangement in the filling of gasoline, oil or other similar liquids into suitable storage tanks disposed within the confines of and carried by said vehicle.

The filler cap assembly 5 of the present invention is particularly advantageous in airplanes. When an airplane is being operated, especially during steep, fast power dives, the vent line provided for the fuel tank by reason of its being too small or too long tends to retard the balancing of tank and ambient atmospheric pressures. Under such circumstances, the valve member 20 of the assembly 5 acts as a pressure relief or sniffle valve and is adapted to be opened slightly against the action of the spring 29 to permit the admission of air to the tank through the relatively porous felt pad 17 and the plug 18, which may be made from similar material, thereby balancing the inside and outside pressures.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a vehicular fueling system embodying a fuel tank disposed in a portion of the body of the vehicle and having a fill opening therein, means facilitating the filling of the tank comprising a removable panel in said body providing access to the fill opening of the tank, a member defining the tank opening and providing a valve seat, a valve hingedly mounted on the opening defining member to swing into the tank in open position and to contact the valve seat when closed, said valve having a domed portion extending outwardly into the opening defining member and a seat portion for engagement with the valve seat, biasing means for urging the valve to closed position, and a porous resilient cushion member on the removable panel for registration with the opening defining member, whereby an increased pressure exteriorly of the vehicle body produces opening of said valve for equalizing the pressure within said tank with the exterior pressure.

2. In a vehicular fueling system embodying a fuel tank disposed in a portion of the body of the vehicle and having a fill opening therein, means facilitating the filling of the tank comprising a removable panel in said body providing access to the fill opening, a flanged member defining the fill opening and providing a valve seat extending into said tank, a resilient, porous cushion member mounted on the removable panel overlying said flanged member and extending partially into said fill opening, a valve hingedly mounted internally of said tank to contact the valve seat, and biasing means for urging the valve toward closed position in contact with valve seat, said biasing means adapted to be deflected by atmospheric pressures outside of the tank in excess of pressures inside of the tank for opening of the valve to balance the tank pressure with the outside pressure.

JACOB RUSH SNYDER.